(12) United States Patent
South et al.

(10) Patent No.: US 6,203,261 B1
(45) Date of Patent: Mar. 20, 2001

(54) ADJUSTABLE RECLAIMING DEVICE FOR MOVING BULK MATERIAL

(75) Inventors: Phillip Barry South, Menan, ID (US); David B. South, Italy, TX (US)

(73) Assignee: Dome Technology, Inc., Idaho Falls, ID (US)

( * ) Notice: Subject to any disclaimer, the term of this patent is extended or adjusted under 35 U.S.C. 154(b) by 0 days.

(21) Appl. No.: 09/253,388

(22) Filed: Feb. 19, 1999

(51) Int. Cl.$^7$ .................................................. B65G 65/38
(52) U.S. Cl. ......................... 414/317; 414/320; 198/511; 198/519
(58) Field of Search ..................... 414/133, 287, 414/288, 297, 304, 305, 310, 311, 312, 313, 317, 315, 316, 319, 320, 321, 326; 366/133, 186; 222/410, 412, 413; 198/519, 511, 506

(56) References Cited

U.S. PATENT DOCUMENTS

| | | | |
|---|---|---|---|
| 3,232,456 | * 2/1966 | Buschbom | 414/313 X |
| 3,358,856 | * 12/1967 | Weibull | 414/317 X |
| 3,363,785 | 1/1968 | Kucera | 214/7 |
| 3,526,328 | * 9/1970 | Garret et al. | 414/320 X |
| 3,658,169 | 4/1972 | Potthoff | 198/36 |
| 3,847,289 | 11/1974 | Fischer . | |
| 4,146,144 | * 3/1979 | Johansson | 414/313 X |
| 4,773,808 | 9/1988 | Fischer et al. | 414/317 |
| 4,775,278 | 10/1988 | Fischer et al. | 414/317 |

FOREIGN PATENT DOCUMENTS

| | | | |
|---|---|---|---|
| 3422569 | * 12/1985 | (DE) | 414/317 |
| 697512 | * 7/1931 | (FR) | 414/317 |
| 1538088 | * 7/1968 | (FR) | 414/313 |
| 193624 | * 12/1964 | (SE) | 414/317 |

OTHER PUBLICATIONS

Automated Reclaim Systems for Dome Storeage, Cambelt International Corporation, 1997.

* cited by examiner

Primary Examiner—Frank E. Werner
(74) Attorney, Agent, or Firm—Workman, Nydegger & Seeley

(57) ABSTRACT

A reclaimer for moving grains and other bulk material in a desired direction includes a substantially cylindrical column upstanding within a storage silo. A track, mounted on the storage silo above the floor, concentrically encircles the column. A motorized carriage is mounted on the track so as to selectively move thereon. Extending between the top end of the column and the carriage is a boom. The proximal end of the boom is rotatably mounted to the column such that movement of the carriage on the tack results in the boom rotating around the column. Suspended from the boom by a pair of winch activated cables is a scraper. The scraper includes an elongated frame having a proximal end that is rotatably and slidably mounted on the column below the boom. Secured along the length of the frame is one or more rotatable augers. By selectively activating the winches, the cables can be used to selectively raise and lower the opposing ends of the scraper so that the augers engage the bulk material within the storage silo. Furthermore, as a result of the cables extending from the boom to the scraper, rotation of the boom also results in rotation of the scraper around the column.

21 Claims, 5 Drawing Sheets

ADJUSTABLE RECLAIMING DEVICE FOR MOVING BULK MATERIAL

BACKGROUND OF THE INVENTION

1. The Field of the Invention

The present invention relates to devices for moving bulk materials. More specifically, this invention relates to reclaiming devices having scrapers which turn in a circular direction about an upstanding column in order to direct bulk material such as grain toward a central location.

2. Present State of the Art

There are a variety of different storage facilities for housing bulk materials such as grains. A typical storage facility includes a substantially enclosed housing, often referred to as a silo, having a floor. Centrally extending through the floor of the housing is an outlet. A conveyor belt is disposed below the floor in alignment with the outlet. During use, the outlet is initially closed and grains or other bulk materials are feed into the housing through an opening in the roof.

When it is desired to move the bulk material, the outlet is opened and the bulk material flows under gravity through the outlet and onto the conveyor belt. The conveyor belt then moves the material to a remote location, such as a loading dock, for shipment to a point of sale.

As a result of the floor of the storage facility being substantially larger than the outlet extending therethrough, a large portion of the bulk material remains standing on the floor surrounding the outlet. This remaining bulk material does not naturally flow into the outlet under the force of gravity. As a result, a variety of different reclaiming devices have been designed which function to move the remaining bulk material from the surrounding floor into the outlet.

Reclaiming devices typically include a scraper having a conveyor belt configuration which rotates on the surface of the bulk material. The scraper draws the bulk material into the outlet. Although scrapers come in a variety of different configurations, each of the conventional designs have their shortcomings. For example, many conventional scrapers have an elongated fixed length extending from a proximal end to a distal end. In one design, the distal end of the scraper is secured to the floor by a track that encircles the outlet. In an alternative design, the proximal end of the track is fixed just above the outlet so as to rotate in a circular fashion.

In both of the above designs, the scraper is substantially covered by the bulk material when the storage facility is filled with bulk material. Filling the bulk material over the scraper can place load stresses on the scraper and can clog or damage moving parts thereof. Furthermore, as a result of the scraper being covered by bulk material, repair, service, and/or inspection of the scraper may not be possible without having to manually move the bulk material surrounding the scraper. In addition, as a result of at least one end of the scraper being fixed at or adjacent to the floor, selective movement of the scraper is limited. Finally, scrapers having a fixed length are also limiting in that they can typically only be used in storage facilities having a specific design or configuration.

SUMMARY AND OBJECTS OF THE INVENTION

Accordingly, it is an object of the present invention to provide an improved device for moving bulk material in a storage facility.

Another object of the present invention is to provide a device for moving bulk material which does not require a movable end of the device to be buried in the bulk material when the storage facility is substantially filled with the bulk material.

It is another object of the present invention to provide a device for moving bulk material which includes a scraper having opposing ends that can be selectively vertically raised or lowered to adjust to the contours of a particular storage facility or configuration of bulk material.

Finally, another object of the present invention is to provide a device for removing bulk material that can be selectively elongated or shortened to operate within storage facilities of different configuration.

To achieve the forgoing objectives and in accordance with the invention as broadly disclosed and claimed herein, a reclaiming device is provided for moving bulk material, such as grain, within a storage structure. The reclaiming device includes a substantially cylindrical column upstanding within the storage structure over an outlet. A track, mounted on the storage structure above the floor, concentrically encircling the column. A motorized carriage is mounted on the track so as to selectively move thereon. Extending between the top end of the column and the carriage is a boom. The proximal end of the boom is rotatably mounted to the column such that movement of the carriage on the tack results in the boom rotating around the column.

Disposed below the boom is a scraper. The scraper includes a collar that is rotatably and slidably mounted on the column. Projecting from the collar is an elongated first frame having one or more rotatable augers mounted thereon. In one embodiment, a second frame having an auger mounted thereon is mounted to the first frame so as to selectively extend and retract thereon.

First and second cables support the scraper below the boom. The first cable extends from a winch mounted on the boom to the distal end of the scraper. The second cable extends from a corresponding winch also mounted on the boom to the proximal end of the scraper. Accordingly, by selectively winding or releasing the cables on their corresponding winch, the proximal and distal ends of the scraper can be selectively raised and lowered. Furthermore, as a result of the fact that the scraper is suspended from the boom by the cables, rotation of the boom also results in rotation of the scraper around the column.

During operation, the scraper is selectively positioned by movement of the cables so as to rest against the bulk material within the storage structure. By activation of the augers, the bulk material is drawn from around the perimeter of the storage structure to an outlet through which the bulk material exits. By rotation of the scraper around the column, the pile of bulk material is uniformly drawn down.

The inventive reclaimer system has a variety of unique benefits over the prior art. Specifically, the scraper can be raised up against the boom during filling of the storage structure with bulk material so that scraper is never covered up by the bulk material. As a result, minimal stress is placed on the scraper by the bulk material. In addition, the scraper is always openly exposed so as to be easily accessible for inspection, maintenance, and repairs.

The fact that the scraper can selectively extend and retract is also an advantage in that the scraper can be used in storage structures having different or changing configurations. Furthermore, the ability to selectively raise and lower opposing ends of the scraper facilitates greater control over the movement and positioning of the bulk material.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
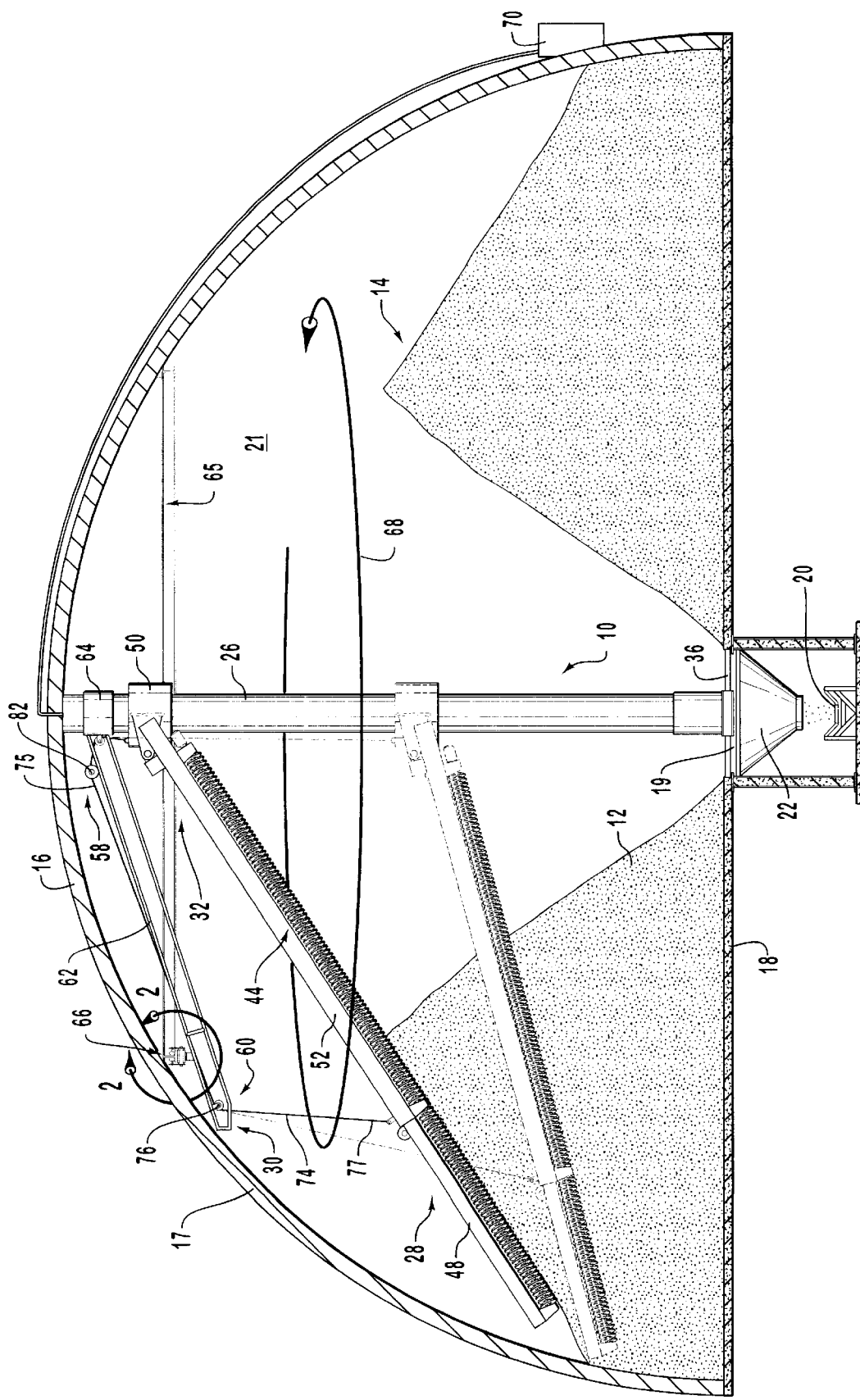
FIG. 1 is a side view of an inventive reclaiming device disposed within a storage facility.

Depicted in FIG. 1 is one embodiment of an inventive reclaimer 10 incorporating features of the present invention. Reclaimer 10 is disposed within a storage structure 16 such as a dome, silo, or other substantially enclosed building. Storage structure 16 includes a housing 17 positioned on a floor 18. Housing 17 and floor 18 bound a chamber 21. Centrally extending through floor 18 is an outlet 19. Outlet 19 communicates with a funnel 22 positioned over a conveyor belt 20. Funnel 22 is configured to be selectively opened and closed so as to control the passing of bulk material therethrough.

During operation, bulk material 12 is dropped into chamber 21 through an opening (not shown) in housing 17. Bulk material 12 is added until chamber 21 is filled to a desired level. As used in the specification and appended claims, the term "bulk material" is broadly intended to include materials such as all types of grains, including wheat, barley, corn, oats, and rice, and other small diameter materials that act similar to gain within storage structure 16. For example, bulk materials also include sand, salt, and small diameter rocks.

When it is desired to remove bulk material 12 from chamber 21, funnel 22 is selectively opened a desired amount to allow bulk material 12 to flow through funnel 22 and onto conveyor belt 20. As a result of floor 18 being larger than outlet 19, a pile 14 of bulk material 12 which does not naturally flow under gravitational force into outlet 19 remains on floor 18. Pile 14 encircles outlet 19 and has an inside face that slopes toward outlet 19. To facilitate movement of pile 14 of bulk material 12 into outlet 19, reclaimer 10 is positioned within chamber 21.

Reclaimer 10 includes a vertically oriented, substantially cylindrical column 26 extending from outlet 19 to housing 17. At its lower end, column 26 is affixed to one or more crossbars 36 extending across outlet 19. In this configuration, column 26 is centrally disposed over outlet 19 but still allows bulk material 12 to flow into outlet 19. The upper end of column 26 is affixed to housing 17. In alterative embodiments, the upper end of column 26 can be secured to a support member attached to housing 17 or may merely extend through an opening in housing 17. In either case, column 26 is supported so as to prevent bending under lateral or moment arm forces. In one embodiment, column 26 is immovably fixed. In an alternative embodiment, as discussed below, column 26 can be configured to rotate.

Mounted at the top end of column 26 is a boom 30. Boom 30 comprises a boom frame 62 and a collar 64. Collar 64 rotatably encircles column 26 and may be disposed on bearings, a circular flange, a race, or other structure which permits collar 26 to rotate without moving along the length of column 26. Boom frame 62 has a proximal end 58 which is either hingedly or rigidly mounted to collar 64. Boom 30 also has an opposing distal end 60.

Figure 2:
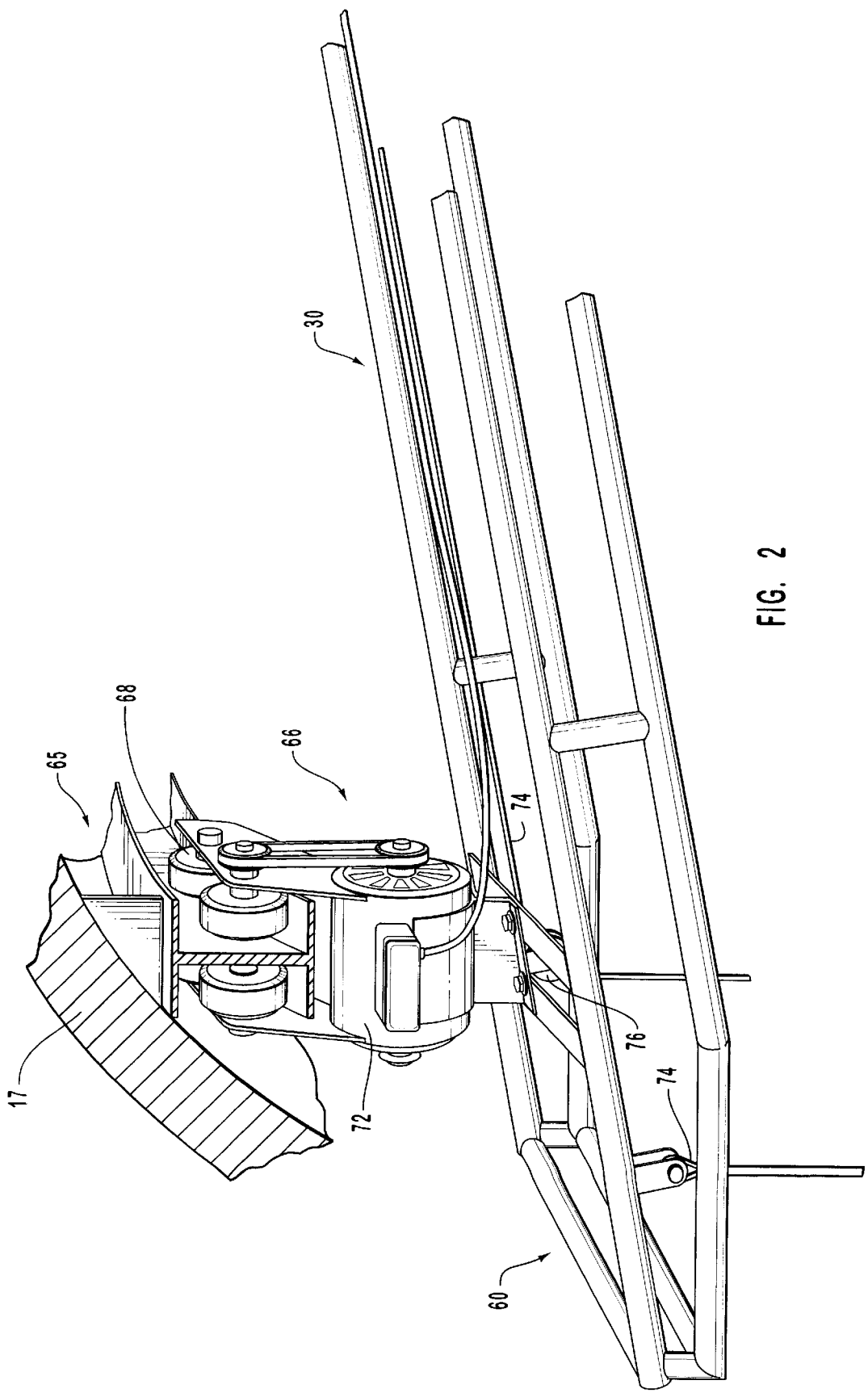
FIG. 2 is a partially cutaway perspective view of a boom shown in FIG. 1 being movably coupled to a track by a carriage.

In one embodiment of the present invention, means are provided for rotating boom 30 around column 26. By way of example and not by limitation, as depicted in FIG. 2, a track 65 is mounted on housing 17 so as to concentrically encircle column 26 above floor 18. A carriage 66 including a motor 72 and wheels 68 is mounted on track 65 so as to selectively travel along track 65. Carriage 66 is also secured to distal end 60 of boom 30. Accordingly, as depicted in FIG. 1, selective travel of carriage 66 along track 65 causes boom 30 to rotate around column 26 as shown by arrow 68.

In an alternative embodiment, a motor can be attached to collar 64 rather than carriage 66 for rotation boom 30. In yet another embodiment, collar 64 can be rigidly attached to column 26. In this embodiment, rather than carriage 66 being motorized, column 26 is coupled with a motor for simultaneous rotation of column 26 and boom 30.

Figure 3:
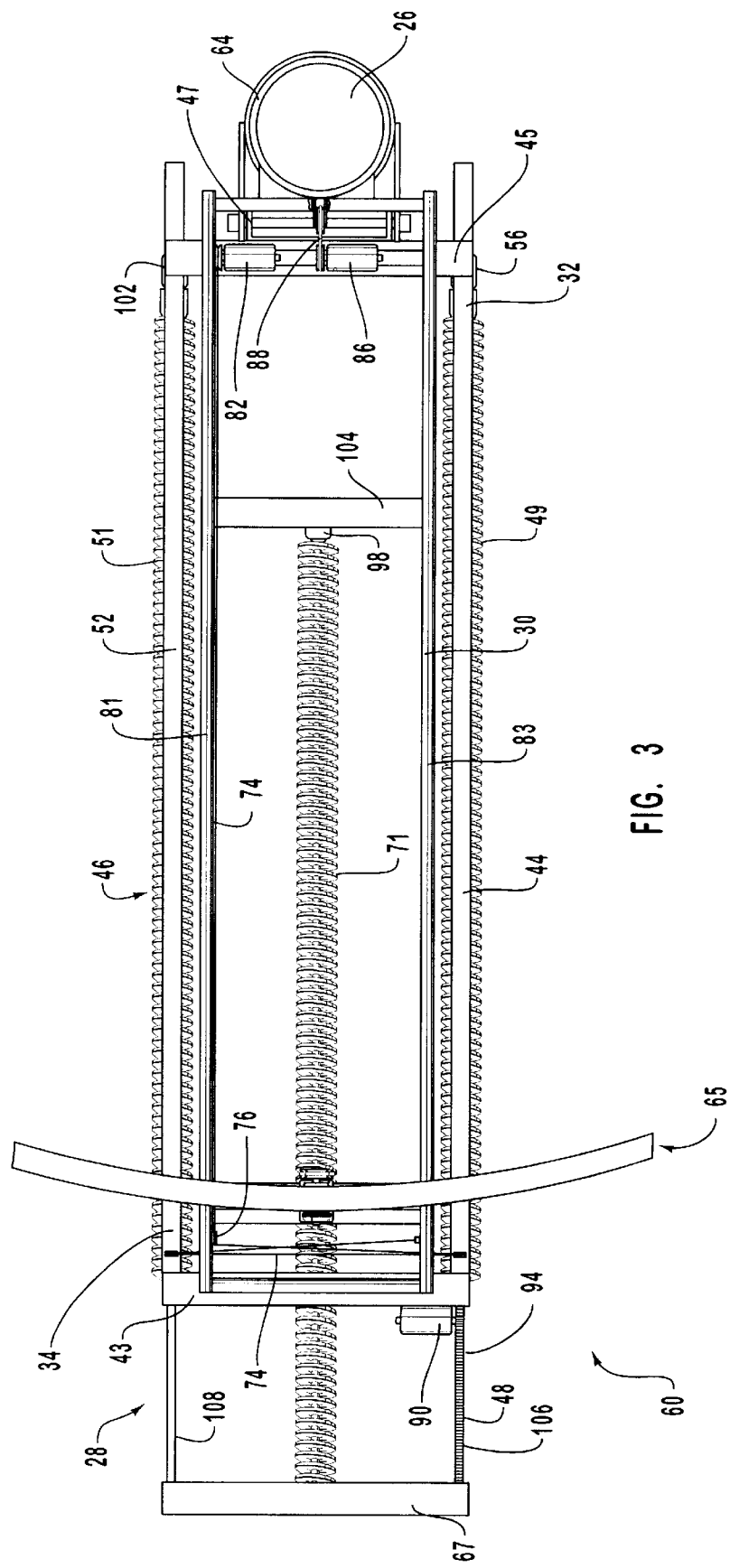
FIG. 3 is a top plan of the boom shown in FIG. 2 disposed over an extendable scraper as shown in FIG. 1.
Figure 5:
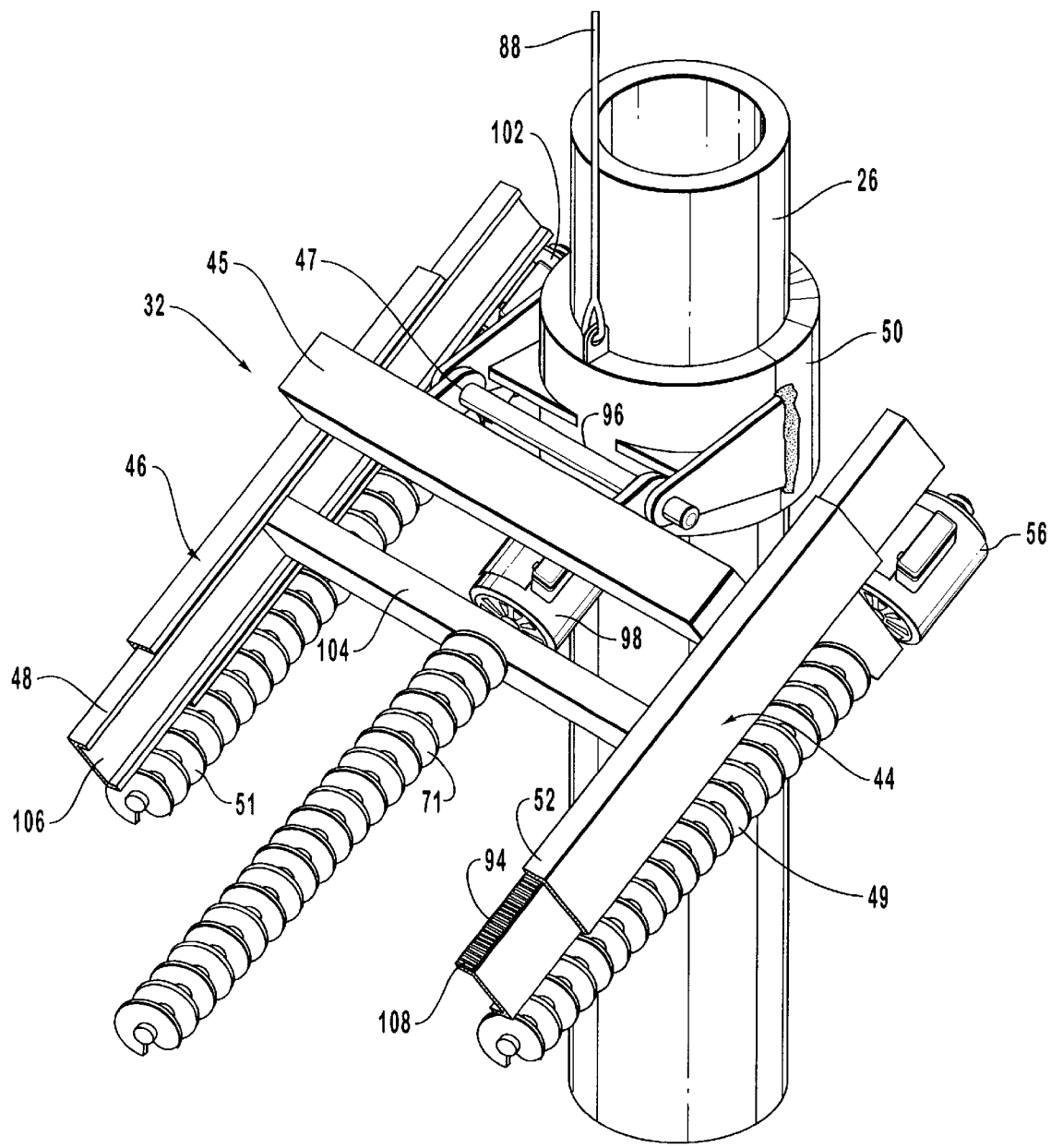
FIG. 5 is a perspective view of the scraper being hingedly attached to the column shown in FIG. 1.

Depicted in FIG. 1, the present invention also includes scraper means for engaging bulk material 12 and displacing bulk material 12 in a desired direction. By way of example and not by limitation, one embodiment of the scraper means is depicted as a scraper 28. Scraper 28 includes a collar 50 which encircles column 26. Collar 50 is configured to freely rotate around column 26 and to freely slide along the length of column 26. Hingedly connected to collar 50 is a first frame 52. As depicted in FIG. 3, first frame 52 includes a pair of longitudinally extending, spaced apart support beams 44 and 46 extending between a proximal end 32 and an opposing distal end 34. A cross member 43 extends between support beams 44 and 46 at distal end 34. Similarly, a cross member 45 extends between support beams 44 and 46 at proximal end 32. As best seen in FIG. 5, cross member 45 is coupled with collar 50 by a hinge assembly 47 including a hinge pin 96.

Returning back to FIG. 3, means are mounted on first frame 52 for engaging and selectively moving bulk material 12. By way of example, mounted on each support beam 44 and 46 along the length thereof are corresponding first and second augers 49 and 51. Augers 49 and 51 are rotatably driven by corresponding motors 56 and 102 also mounted on first frame 52. As discussed later in greater detail, augers 49 and 51 are configured to engage bulk material 12 and displace it towards outlet 19. In alternative embodiments, augers 49 and 51 can be replaced with different rotating screw configurations, conveyer belts with or without paddles thereon, and other types of continuous dragging or transport systems that are commonly used for grain movement. As used in the specification and appended claims, the term "conveyor" shall include an auger and alternatives thereto as discussed above.

In one embodiment of the present invention, the scraper means and scraper 28 can include a second frame 48 that is retractably mounted to first frame 52. Second frame 48 includes a pair of longitudinally extending, spaced apart support members 106 and 108 that are slidably mounted on support beams 44 and 46. Cross members 67 and 104 extend between opposing ends of support members 106 and 108. Extending between cross members 67 and 104 is an auger 71 driven by a motor 98. Auger 71 can also be replaced with the same alternatives as discussed with regard to augers 49 and 51.

The present invention also includes means for selectively advancing and retracting second frame 48 relative to first frame 52. By way of example and not by limitation, teeth 94 are formed on support member 106. A motor 90 mounted on first frame 52 engages teeth 94 with a gear to selectively advance or retract second frame 48 relative to first frame 52. It is appreciated that there are a variety of different ways in which second frame 48 can be moved relative to first frame 52.

In one embodiment of the present invention, means are also provided for selectively moving the distal end of scraper 28 in a vertical plane. By way of example and not by limitation, as depicted in FIG. 1, a cable 74 has a first end 75 mounted to a motorized winch 82 and an opposing second end 77 connected to the distal end of scraper 28. Winch 82 is disposed at proximal end 58 of boom 30. Cable 74 extends from winch 82 through a pulley 76 positioned at distal end 60 of boom 30 and down to scraper 28. Accordingly, by selectively winding or releasing cable 74 on winch 82, the distal end of scraper 28 vertically moves up and down in a vertical plane.

Figure 4:
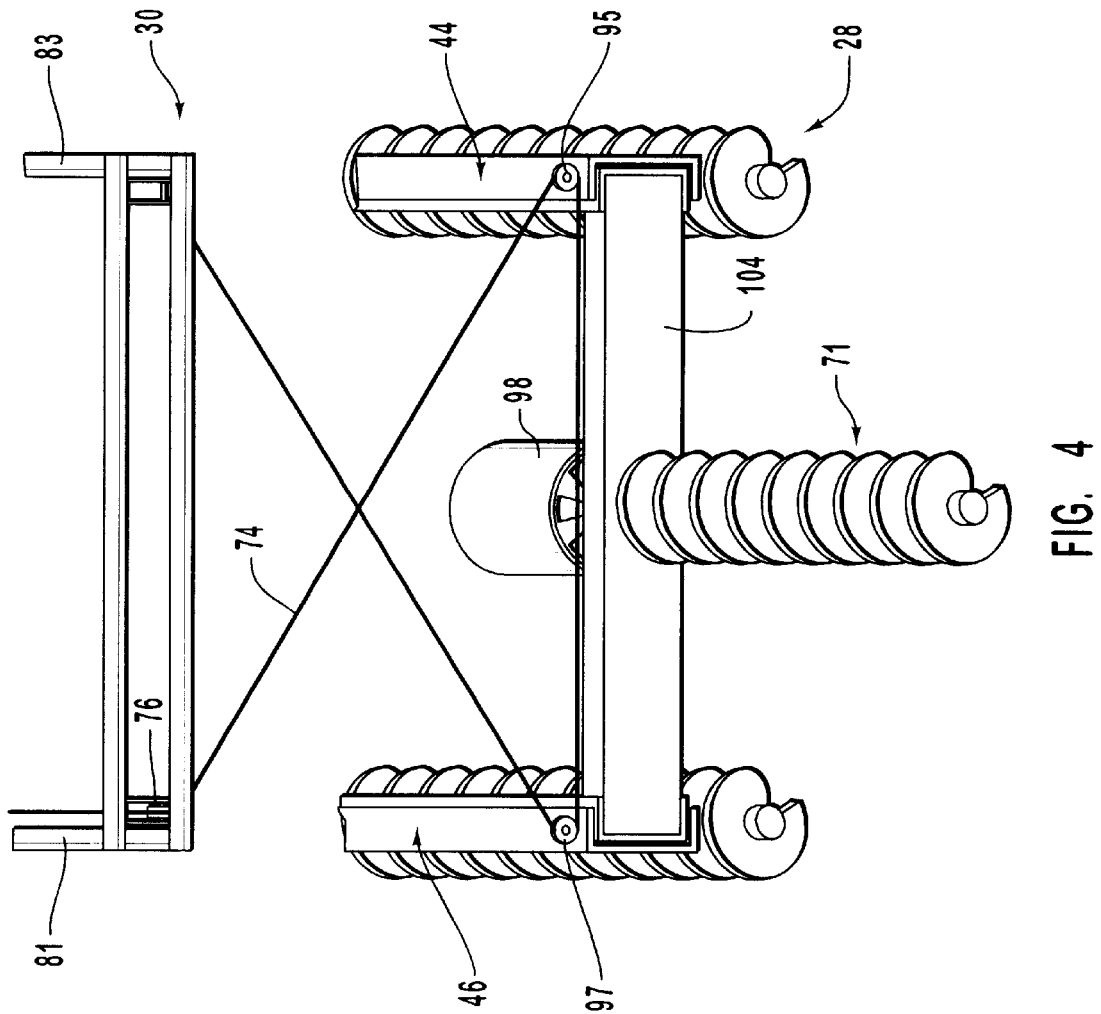
FIG. 4 is front perspective view of the boom and scraper shown in FIG. 3.

In alternative embodiments, cable 74 can be fixed to travel in a variety of different paths. For example, as depicted in FIGS. 3 and 4, cable 74 can be positioned to travel down a first side 81 of boom 30 to pulley 76. Cable 74 then crosses from pulley 76 to a pulley 95 located on support beam 44 of scraper 28. From pulley 76, cable 74 travels over to a pulley 97 located on support beam 46 of scraper 28. Finally, cable 74 crosses over and up from pulley 97 to a second side 83 of boom 30. Cable 74 can then be secured at the distal end of boom 30 or extend back to the proximal end of boom 30. This configuration of having cable 74 cross over between boom 30 and scraper 28 functions to stabilize scraper 28 and provide better movement control.

The present invention also includes means for selectively moving the proximal end of scraper 28 along the length of column 26. By way of example and not by limitation, as depicted in FIGS. 3 and 5, a cable 88 extends from a motorized winch 86 located at the proximal end of boom 30 to collar 50 of scraper 28. Accordingly, by selectively winding or releasing cable 88 on winch 86, the proximal end of scraper 28, and more specifically collar 50, moves vertically up and down along the length of column 50.

During operation, scraper 28 is initially raised so as to be disposed adjacent to boom 30. In this configuration, chamber 21 can be substantially filled with bulk material 12 without covering or otherwise enclosing scraper 28. As a result, potential damage or clogging of scraper 28 is minimized. Furthermore, scraper 28 is always readily exposed above bulk material 12 to allow easy access for repair and maintenance of scraper 28.

As previously discussed, by opening outlet 19, some of bulk material 12 freely drains out though outlet 19 under gravitational force. To reclaim the remaining bulk material 12, the distal end of scraper 28 is selectively lowered by unwinding cable 74 so that scraper 28, and more specifically, the augers disposed thereon, engage remaining pile 14 of bulk material 12. Depending on the configuration of storage structure 16, the distal end of scraper 28 can also be selectively extended so as to be positioned adjacent to housing 17.

In this position, the augers are engaged to rotate. In turn, the augers draw bulk material 12 to the inside face of pile 14 where it slides down the face thereof and into outlet 19. Where scraper 28 is extended, auger 71 operates to draw bulk material 12 back from the outer perimeter of storage structure 16 to augers 49 and 51. Augers 49 and 51 then draw bulk material 12 back to the inner face of pile 14 where it slides down into outlet 19. The extending of central auger 71 is particularly useful in dome-shaped storage structures and other structures in which the diameter of the structure decreases toward the roof thereof. As the pile lowers, central auger 71 can be extended to reach material located a greater distance from column 26. Reclaimer 10 can thus be successfully employed in a variety of different structures such as cylindrical-shaped structures, conical structures, round structures, or even square, rectangular, or otherwise shaped structures.

To uniformly draw down pile 14 encircling outlet 19, carriage 66 is engaged to travel around track 65 which in turn causes boom 30 to rotate around column 26. As a result of scraper 28 being connected to boom 30 by cables 74 and 88, rotation of boom 30 also results in the rotation of scraper 28 around column 26. As scraper 28 continues to rotate around column 26, the augers function to drawn down pile 14 in a uniform manner. As bulk material 12 flows out through outlet 19 so that pile 14 is lowered, cables 74 and 88 are unwound from their corresponding winch so that the augers remain engaged with bulk material 12. This ability to selectively raise and lower the opposing ends scraper 28 provides for increased freedom in how bulk material 12 is moved within chamber 21. Scraper 28 can also be incrementally extended or retracted depending on the configuration of storage structure 16. This process continues until the augers are resting on or adjacent to floor 18 so that substantially all of bulk material 12 is feed out through outlet 19.

An example of a control unit 70 for controlling the movement of scraper 28 is also shown in FIG. 1. In one embodiment, control unit 70 houses manual controls, such as electrical controls, for manually controlling the movement of scraper 28 by controlling the vertical positioning of proximal end 32 and distal end 34 and by controlling the velocity of scraper 28 in a circular direction. In one embodiment of manual control, a window through wall of storage structure 16 or a camera mounted inside storage structure 16 enables a practitioner to view bulk material 12 and the route of scraper 28.

In another embodiment, scraper 28 can be controlled automatically, such as through use of sensors which indicate the positioning of the proximal and distal ends of scraper 28. The opposing ends can automatically be moved or down in response to a sensed pile height. In yet another embodiment, a control unit 70 sets scraper 28 on a predetermined program. The program sets the rotation speed and downward movement of scraper 28.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A reclaimer for moving bulk material disposed on a floor within a domed storage structure, the reclaimer comprising:

(a) an upstanding column configured to be disposed within the domed storage structure;

(b) a track configured to mount on the domed storage structure so as to encircle the column above the floor;

(c) a boom having a proximal end rotatably coupled to the column and an opposing distal end mounted on the track, the boom being power driven so that the distal end selectively moves along the track;

(d) a scraper having a proximal end and a distal end, the scraper comprising:

(i) a collar rotatable and slidably mounted on the column below the boom;

(ii) a first frame having a first end and an opposing second end, the first end being attached to the collar;

(iii) means mounted on the first frame for engaging and selectively moving the bulk material;

(iv) a second frame movably disposed on the first frame such that the second frame can selectively advance and retract relative to the first frame; and (v) means mounted on the second frame for engaging and selectively moving the bulk material; and (f) means at least partially extending from the boom to the scraper for selectively moving the distal end of the scraper in a vertical plane.

2. A reclaimer as recited in claim 1, wherein the distal end of the boom is mounted to the track by a motorized carriage.

3. A reclaimer as recited in claim 1, wherein the means for selectively moving the distal end of the scraper in a vertical plane comprises:

(a) a first cable extending from the distal end of the boom to the distal end of the scraper; and (b) means for selectively winding and releasing the first cable.

4. A reclaimer as recited in claim 1, further comprising means at least partially extending from the boom to the scraper for selectively moving the proximal end of the scraper along the column.

5. A reclaimer as recited in claim 4, wherein the means for selectively moving the proximal end of the scraper along the column comprises:

(a) a second cable extending from the proximal end of the boom to the proximal end of the scraper; and (b) means for selectively winding and releasing the second cable.

6. A reclaimer as recited in claim 1, wherein the first end of the first frame is pivotally mounted to the collar.

7. A reclaimer as recited in claim 1, wherein the means mounted on the first frame for engaging and selectively moving the bulk material comprises a first auger mounted on the first frame.

8. A reclaimer as recited in claim 1, wherein the means mounted on the second frame for engaging and selectively moving the bulk material comprises a second auger movably mounted on the second frame.

9. A reclaimer as recited in claim 1, wherein the collar encircles the column.

10. A reclaiming system for use with bulk materials, the system comprising:

(a) a storage structure disposed on a floor, the storage structure having a dome shaped inner wall bounding a holding chamber;

(b) an upstanding column disposed within the chamber of the storage structure;

(c) a track mounted on the inner wall of the storage structure above the floor and encircling the column;

(d) a boom having a proximal end rotatably coupled to the column and an opposing distal end mounted on the track, the boom being power driven so that the distal end selectively moves along the track;

(e) a scraper comprising:
(i) a collar rotatably and slidably mounted on the column below the boom;
(ii) a first frame having a first end and an opposing second end, the first end being attached to the collar;
(iii) means mounted on the first frame for engaging and selectively moving the bulk material;
(iv) a second frame movably disposed on the first frame such that the second frame can selectively advance and retract relative to the first frame; and
(v) means mounted on the second frame for engaging and selectively moving the bulk material; and (f) means for selectively moving the scraper in a vertical plane.

11. A reclaimer system as recited in claim 10, wherein the means mounted on the first frame for engaging and selectively moving the bulk material comprises an auger rotatably mounted on the first frame.

12. A reclaimer system as recited in claim 10, wherein the means for selectively moving the scraper in a vertical plane comprises:

(a) a cable extending from the boom to the scraper; and (b) means for selectively winding and releasing the cable.

13. A reclaimer system as recited in claim 10, wherein the column vertically extends between the floor and the storage structure.

14. A reclaimer system as recited in claim 10, wherein the first end of the first frame is hingedly mounted to the collar.

15. A reclaimer system as recited in claim 10, wherein the means mounted on the second frame for engaging and selectively moving the bulk material comprises a second auger movably mounted on the second frame.

16. A reclaimer system as recited in claim 10, wherein the collar encircles the column.

17. A reclaimer system as recited in claim 10, further comprising an opening formed on the floor adjacent to the column, the opening being configured to enable passage of the bulk material therethrough.

18. A reclaiming system for use with bulk materials, the system comprising:

(a) a storage structure disposed on a floor, the storage structure having a dome shaped inner wall bounding a holding chamber;

(b) an column disposed within the chamber and vertically extending from the floor;

(c) a track mounted on the inner wall of the storage structure above the floor and encircling the column;

(d) a boom having a proximal end rotatably coupled to the column and an opposing distal end mounted on the track, the boom being power driven so that the distal end selectively moves along the track;

(e) a scraper comprising:
(i) a collar rotatably and slidably mounted on the column below the boom;
(ii) a first frame having a first end and an opposing second end, the first end of the first frame being hingedly mounted to the collar;
(iii) a first conveyor mounted on the first frame;
(iv) a second frame movably disposed on the first frame such that the second frame can selectively advance and retract relative to the first frame; and
(v) a second conveyor mounted to the second frame; and (f) a winched cable extending between the boom and the scraper for selectively lowering and raising the scraper relative to the boom.

19. A reclaiming system as recited in claim 18, further comprising a third conveyor mounted on the first frame such that at least a portion of the second conveyor is disposed between the first conveyor and the third conveyor.

20. A reclaiming system as recited in claim 18, wherein the first conveyor comprises an auger.

21. A reclaimer system as recited in claim 18, wherein the second conveyor comprises an auger.

* * * * *

UNITED STATES PATENT AND TRADEMARK OFFICE
CERTIFICATE OF CORRECTION

PATENT NO. : 6,203,261 B1
DATED : March 20, 2001
INVENTOR(S) : Philip Barry South, David B. South It is certified that error appears in the above-identified patent and that said Letters Patent is hereby corrected as shown below:

<u>Title page,</u>
OTHER PUBLICATIONS, line 1, please change "Storeage" to -- Storage --

<u>Column 2,</u>
Line 21, please change "tack" to -- track --

<u>Column 6,</u>
Line 15, please change "ends scraper" to -- ends of scraper --
Line 21, please change "feed" to -- fed --

Signed and Sealed this

Twenty-sixth Day of March, 2002

Attest:

JAMES E. ROGAN
*Attesting Officer*   *Director of the United States Patent and Trademark Office*